(12) United States Patent
Shin et al.

(10) Patent No.: US 12,448,548 B2
(45) Date of Patent: Oct. 21, 2025

(54) AQUEOUS FLAME RETARDANT ADHESIVE COMPOSITION AND METHOD FOR PREPARING SAME

(71) Applicant: HANWHA SOLUTIONS CORPORATION, Seoul (KR)

(72) Inventors: Yeonran Shin, Daejeon (KR); Jaesong Kim, Daejeon (KR); Taeyoung Jang, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 502 days.

(21) Appl. No.: 17/997,540

(22) PCT Filed: Dec. 27, 2021

(86) PCT No.: PCT/KR2021/019972
§ 371 (c)(1),
(2) Date: Oct. 29, 2022

(87) PCT Pub. No.: WO2022/145935
PCT Pub. Date: Jul. 7, 2022

(65) Prior Publication Data
US 2023/0167338 A1   Jun. 1, 2023

(30) Foreign Application Priority Data
Dec. 29, 2020   (KR) .................. 10-2020-0186088

(51) Int. Cl.
| | | |
|---|---|---|
| *C08L 27/06* | (2006.01) | |
| *C09J 5/00* | (2006.01) | |
| *C09J 7/38* | (2018.01) | |
| *C09J 11/06* | (2006.01) | |
| *C09J 11/08* | (2006.01) | |
| *C09J 123/08* | (2006.01) | |
| *C09J 131/04* | (2006.01) | |

(52) U.S. Cl.
CPC .............. *C09J 11/08* (2013.01); *C08L 27/06* (2013.01); *C09J 5/00* (2013.01); *C09J 7/381* (2018.01); *C09J 11/06* (2013.01); *C09J 123/0853* (2013.01); *C09J 131/04* (2013.01); *C08L 2201/02* (2013.01); *C08L 2201/54* (2013.01); *C09J 2301/408* (2020.08); *C09J 2301/414* (2020.08); *C09J 2427/00* (2013.01); *C09J 2431/00* (2013.01)

(58) Field of Classification Search
CPC ... C09J 11/08; C09J 5/00; C09J 131/04; C09J 2301/408; C09J 2427/00; C08L 27/06; C08L 2201/54; C08L 2201/02
USPC ......................................................... 524/285
See application file for complete search history.

(56) References Cited

U.S. PATENT DOCUMENTS

| | | |
|---|---|---|
| 2007/0037926 A1 | 2/2007 | Olsen |
| 2010/0003879 A1 | 1/2010 | Conesa |
| 2010/0298477 A1 | 11/2010 | Godwin |
| 2013/0225737 A1 | 8/2013 | Gosse |
| 2020/0131332 A1 | 4/2020 | McBride |
| 2022/0298394 A1* | 9/2022 | Shin .................... C08L 27/06 |

FOREIGN PATENT DOCUMENTS

| | | | |
|---|---|---|---|
| CN | 104974674 A | 10/2015 | |
| CN | 106366723 A | 2/2017 | |
| CN | 108350154 A | 7/2018 | |
| EP | 3265500 B1 | 1/2018 | |
| JP | S59-120669 A | 7/1984 | |
| JP | H0525447 A | 2/1993 | |
| JP | H06218045 A * | 8/1996 | |
| JP | H08218045 A | 8/1996 | |
| JP | H10273587 A | 10/1998 | |
| JP | 2018-145313 A | 9/2008 | |
| JP | 4357263 B2 | 11/2009 | |
| JP | 2017531717 A | 10/2017 | |
| JP | 2019-163384 A | 9/2019 | |
| JP | 2020517794 A | 6/2020 | |
| KR | 2016-0139001 A | 12/2016 | |
| KR | 2018-0121351 A | 11/2018 | |
| KR | 2021-0025917 A | 3/2021 | |
| WO | 2020130315 A1 | 6/2020 | |
| WO | WO-2021040253 A1 * | 3/2021 | .............. C08F 2/22 |

OTHER PUBLICATIONS

International Search Report Date Apr. 18, 2022.

* cited by examiner

*Primary Examiner* — Ruiyun Zhang
(74) *Attorney, Agent, or Firm* — Harvest IP Law, LLP

(57) ABSTRACT

This invention relates to an aqueous flame retardant adhesive composition that is environment-friendly, reduces cost through replacement of organic flame retardant, improves layer separation of adhesive according to the addition of inorganic flame retardant, and exhibits excellent adhesive strength, low temperature stability, processability and extraction resistance, and a method for preparing the same.

18 Claims, No Drawings

AQUEOUS FLAME RETARDANT ADHESIVE COMPOSITION AND METHOD FOR PREPARING SAME

CROSS-REFERENCE TO RELATED APPLICATION(S)

This application is a National Stage of International Application No. PCT/KR2021/019972 filed on Dec. 27, 2021, claiming priority based on Korean Patent Application No. 10-2020-0186088 filed on Dec. 29, 2020 with the Korean Intellectual Property Office, the disclosures of which are herein incorporated by reference in their entirety.

This invention relates to an aqueous flame retardant adhesive composition and a method for preparing the same, and more specifically, to an aqueous flame retardant adhesive composition that is environment-friendly, reduces cost through replacement of organic flame retardant, improves layer separation of adhesive according to the addition of inorganic flame retardant, and exhibits excellent adhesive strength, low temperature stability, processability and extraction resistance, and a method for preparing the same.

TECHNICAL FIELD

Background Art

Most of currently used adhesives are adhesives using organic solvents. However, with strengthening of internal and external environmental regulations and increase in work environment cleaning requirements, and due to advantageousness in terms of cost reduction and productivity improvement, the need for water-dispersed adhesives is expanding.

In case the existing organic solvent-type adhesive is replaced with an aqueous adhesive, since water is used as a continuous medium, workability may be improved due to convenient mixing and handling, as well as cost reduction, and cleaning of working environment and post-treatment process may be omitted.

As the aqueous adhesive, chloroprene latex-based adhesive in the form of a polymer emulsion, a vinyl chloride emulsion, a vinylidene chloride emulsion, a vinyl chloride acrylic acid ester copolymer emulsion, or a vinyl chloride ethylene vinyl acetate copolymer emulsion, and the like are being suggested. However, in case these polymer emulsions are used alone, flame retardancy may not be realized.

Thus, in order to realize flame retardancy, a method of using an organic or inorganic flame retardant has been suggested. The organic flame retardant is largely classified into non-halogen-based flame retardants such as phosphorus-based, nitrogen-based, and the like, and halogen-based flame retardants such as brome-based, chlorine-based, and the like, and the inorganic flame retardant is largely classified into metal hydroxide-based such as aluminum hydroxide, magnesium hydroxide, and the like, and antimony-based.

Although the organic flame retardant has excellent flame retarding effect, it is expensive, and some organic flame retardants, particularly brome-based flame retardants are harmful to human body due to dioxin generation during combustion. And, since the inorganic flame retardant should be used in an excessive amount, it is separated or precipitated as time passes, thus making work impossible, or requiring additional mixing process.

DISCLOSURE

Technical Problem

In order to solve the above problems, according to the invention, there are provided an aqueous flame retardant adhesive composition that is environment-friendly, reduces cost through replacement of organic flame retardant, improves layer separation of adhesive according to the addition of inorganic flame retardant, and exhibits excellent adhesive strength, low temperature stability, processability and extraction resistance, and a method for preparing the same.

Technical Solution

In order to achieve the object, according to the invention, there is provided an aqueous flame retardant adhesive composition comprising: base resin selected from the group consisting of vinyl acetate-ethylene copolymer, acryl-based resin, urethane-based resin, and silicon-based resin; an aqueous polyvinyl chloride emulsion; a cyclohexane-based plasticizer; and a benzoate-based plasticizer.

According to the invention, there is also provided a method for preparing the aqueous flame retardant adhesive composition, comprising steps of: conducting emulsion polymerization or seed emulsion polymerization of vinyl chloride monomers alone, or a mixture of vinyl chloride monomers and comonomers copolymerizable therewith in an aqueous medium, to prepare an aqueous polyvinyl chloride emulsion in which polyvinyl chloride is dispersed in the aqueous medium; and mixing the aqueous polyvinyl chloride emulsion with base resin selected from the group consisting of vinyl acetate-ethylene copolymer, acryl-based resin, urethane-based resin, and silicon-based resin, and adding a cyclohexane-based plasticizer and a benzoate-based plasticizer and mixing them.

According to the invention, there is also provided an article comprising the aqueous flame retardant adhesive composition.

Advantageous Effects

The aqueous flame retardant adhesive composition according to the invention is environment-friendly, reduces cost through replacement of organic flame retardant, improves layer separation of adhesive according to the addition of inorganic flame retardant, exhibits excellent adhesive strength and low temperature stability, and has improved processability and extraction resistance. Thus, the adhesive composition may be applied in various fields such as construction, various industries, and the like, and specifically, it may be usefully applied for construction/industrial adhesive, adhesive films, deco sheets, flooring materials, artificial leather, or toys.

BEST MODE

The terms used herein are only to explain specific embodiments, and are not intended to limit the invention. A singular expression includes a plural expression thereof, unless it is expressly stated or obvious from the context that such is not intended.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, an aqueous flame retardant adhesive composition and a method for preparing the same will be explained in detail according to specific embodiments of the invention.

The inventors confirmed that in case an aqueous polyvinyl chloride-based emulsion is mixed with a base resin when preparing an aqueous adhesive composition, excellent flame retardancy may be exhibited even without using a flame retardant or with decreased amount, and furthermore, by using an environment-friendly cyclohexane dicarboxylate-based plasticizer as a processing aid, adhesive strength may be enhanced, and by using a benzoate-based plasticizer, processability and extraction resistance may be improved, and completed the invention.

Specifically, the aqueous flame retardant adhesive composition according to the invention comprises
- base resin selected from the group consisting of vinyl acetate-ethylene copolymer, acryl-based resin, urethane-based resin, and silicon-based resin;
- an aqueous polyvinyl chloride emulsion;
- a cyclohexane-based plasticizer; and
- a benzoate-based plasticizer.

In the aqueous flame retardant adhesive composition, the base resin may be vinyl acetate-ethylene(VAE) copolymer, acryl-based resin, rubber-based resin, urethane-based resin, or silicon-based resin, and the like. These base resins are environment-friendly because they do not use brome-based flame retardant, compared to the existing synthetic rubber latex used in adhesive compositions.

Among the base resins, vinyl acetate-ethylene(VAE) copolymer having excellent adhesion property and excellent compatibility with an aqueous polyvinyl chloride emulsion may be preferable.

And, the base resin may be an aqueous medium, specifically an aqueous emulsion in which the base resin particles are dispersed in water. Wherein, it is preferable that the base resin has an average particle diameter of 100 nm to 1.5 $\mu m$, more specifically 500 nm to 1.2 $\mu m$. If the average particle diameter is less than 100 nm, particle stability may be deteriorated, and if it is greater than 1.5 $\mu m$, cohesion of particles after drying may be lowered, and thus, there is a concern about deterioration of adhesion properties.

The base resin may have a weight average molecular weight of 100,000 g/mol or more, and 700,000 g/mol or less. If the weight average molecular weight is less than 100,000 g/mol, there is a concern about deterioration of durability due to decrease in cohesion, and if it is greater than 700,000 g/mol, adhesion property may be deteriorated, or coatability may be deteriorated due to increase in particle size or viscosity.

For example, in case vinyl acetate-ethylene(VAE) copolymer is used as the base resin, the vinyl acetate-ethylene copolymer may be emulsion copolymer formed by emulsion polymerization of 10 to 20 wt % of ethylene and 30 to 50 wt % of vinyl acetate with 40 to 60 wt % of polyvinyl alcohol, based on the total weight of copolymer.

For another example, in case acryl-based resin is used as the base resin, the acryl-based resin may be polymer of a monomer mixture comprising (meth)acrylic acid ester-based monomers and crosslinkable monomers.

The kind of the (meth)acrylic acid ester-based monomers is not specifically limited, and for example, alkyl methacrylate may be used. In this case, if the alkyl group included in the monomer too lengthens, cohesion of the cured product may be deteriorated, and it may become difficult to control glass transition temperature or adhesion property, and thus, alkyl methacrylate having a carbon number of 1 to 14, preferably 1 to 8 may be used. As the examples of such monomers, methyl methacrylate, ethyl methacrylate, n-propyl methacrylate, isopropyl methacrylate, n-butyl methacrylate, t-butyl methacrylate, sec-butyl methacrylate, pentyl methacrylate, 2-ethylhexyl methacrylate, 2-ethylbutyl methacrylate, n-octyl methacrylate, isooctyl methacrylate, isobornyl methacrylate or isononyl methacrylate, and the like may be mentioned, and one of them or mixtures of two or more kinds may be used herein.

And, the crosslinkable monomers included in the monomer mixture mean monomers simultaneously comprising a copolymerizable functional group (for example, carbon-carbon double bond) and a crosslinkable functional group in the molecular structure, and the monomers may give crosslinkable functional groups capable of reacting with a multifunctional crosslinking agent to polymer.

As the examples of the crosslinkable monomers, hydroxy group-containing monomers, carboxyl group-containing monomers or nitrogen-containing monomers, and the like may be mentioned, and one of them or mixtures of two or more kinds may be used herein. In the present disclosure, it is particularly preferable to use carboxyl group-containing monomers as the crosslinkable monomers, but the crosslinkable monomers are not limited thereto.

As the examples of the hydroxy group-containing monomers, 2-hydroxyethyl methacrylate, 2-hydroxypropyl methacrylate, 4-hydroxybutyl methacrylate, 6-hydroxyhexyl methacrylate, 8-hydroxyoctyl methacrylate, 2-hydroxyethyleneglycol methacrylate or 2-hydroxypropyleneglycol methacrylate, and the like may be mentioned; and as the examples of the carboxy group-containing monomers, acrylic acid, methacrylic acid, 2-methacryloyloxy acetic acid, 3-methacryloyloxy propanoic acid, 4-methacryloyloxy butanoic acid, acrylic acid dimer, itaconic acid or maleic acid, and the like may be mentioned; and as the examples of the nitrogen-containing monomers, 2-isocyanatoethyl methacrylate, 3-isocyanatopropyl methacrylate, 4-isocyanatobutyl methacrylate, methacrylamide, N-vinyl pyrrolidone or N-vinyl caprolactam, and the like may be mentioned, but not limited thereto.

The monomer mixture may comprise, based on the total weight of the monomer mixture, 80 to 99.9 wt % of the methacrylic acid ester-based monomers and 0.1 to 20 wt % of the crosslinkable monomers, preferably, 90 to 99.9 wt % of the methacrylic acid ester-based monomers and 0.1 to 10 wt % of the crosslinkable monomers.

A method for preparing base resin comprising the above components is not specifically limited, and for example, it may be prepared by a common polymerization method such as solution polymerization, photopolymerization, bulk polymerization, suspension polymerization or emulsion polymerization. In the present disclosure, it is preferable to prepare water-dispersed base resin by suspension polymerization or emulsion polymerization, more preferably, by emulsion polymerization.

Meanwhile, in the aqueous flame retardant adhesive composition, the aqueous polyvinyl chloride emulsion is a water-dispersed emulsion in which polyvinyl chloride is dispersed in water, and when included in an adhesive composition, it may exhibit more excellent flame retardancy than other aqueous base resins, due to the molecular structure of polyvinyl chloride.

Throughout the specification, "polyvinyl chloride" refers to (co)polymer copolymerized from vinyl chloride-based monomers alone, or vinyl chloride-based monomers and comonomers copolymerizable therewith. Besides, it may be prepared by suspension polymerization, microsuspension polymerization, emulsion polymerization, or miniemulsion polymerization, and the like, by mixing a suspension agent, a buffering agent and a polymerization initiator, and the like.

The comonomers that can be copolymerized with the vinyl chloride monomers may include, for example, vinyl ester-based monomers including ethylene vinyl acetate monomers and vinyl propionate monomers; olefin-based monomers including ethylene, propylene, isobutyl vinyl ether, and halogenated olefin; methacrylic acid ester-based monomers including methacrylic acid alkyl ester; maleic anhydride monomers; acrylonitrile monomers; styrene monomers; and halogenated polyvinylidene, and the like, and one or more of them may be mixed to prepare copolymer with vinyl chloride monomers. However, the invention is not limited to the above explained monomers, and monomers commonly used to form copolymer through the polymerization reaction with vinyl chloride monomers in the technical field to which the invention pertains may be used without specific limitations, according to required properties or use of the aqueous flame retardant adhesive composition.

And, the properties of polyvinyl chloride such as glass transition temperature, particle size, and the like, may be controlled through control of polymerization conditions during the polymerization reaction.

And, although required glass transition temperature(Tg) of polyvinyl chloride may vary according to adhesion base, for example, the glass transition temperature(Tg) of polyvinyl chloride may be −20° C. or more, and 80° C. or less.

In the present disclosure, the glass transition temperature (Tg) of polyvinyl chloride may be measured using DSC (Differential Scanning calorimeter) equipment.

And, the polyvinyl chloride exists as particle phase dispersed in water, and has an average particle diameter of 100 nm to 1 $\mu$m, more specifically 100 nm to 0.5 $\mu$m. If the average particle diameter is less than 100 nm, particle stability may be deteriorated, and thus, dispersibility in emulsion may be deteriorated due to aggregation between polyvinyl chloride particles, and if it is greater than 1 $\mu$m, storage stability may be lowered, and cohesion of particles after drying may be lowered, and thus, adhesion properties may be deteriorated.

Meanwhile, in the present disclosure, the average particle diameters of polyvinyl chloride and base resin may be measured according to common particle size distribution measurement methods such as optical microscopy, light scattering measurement method, and the like, and specifically, may be measured using Zetasizer or Master Sizer of Malvern company.

And, the polyvinyl chloride may have weight average molecular weight(Mw) of 45,000 to 300,000 g/mol, more specifically 50,000 to 130,000 g/mol. Within the above range of weight average molecular weight, dispersibility in emulsion is excellent, thus improving mechanical stability. In the present disclosure, the weight average molecular weight of polyvinyl chloride is standard polystyrene conversion value by gel permeation chromatography.

Specifically, the weight average molecular weights(Mw) of the polyvinyl chloride and base resin respectively mean polyvinyl chloride and polystyrene conversion value measured by GPC(gel permeation chromatography). Specifically, it may be measured using Polymer Laboratories PLgel MIX-B 300 mm column and Waters PL-GPC220 device, and the measurement temperature is 160° C., tetrahydrofuran or 1,2,4-trichlorobenzene is used as a solvent, and the flow rate is set as 1 mL/min. A polyvinyl chloride or base resin sample is prepared at the concentration of 10 mg/10 mL, and then, supplied in an amount of 200 $\mu$L. Using a calibration curve formed using polyvinyl chloride and polystyrene standard, Mw and Mw values are derived, wherein the molecular weight(g/mol) of the polyvinyl chloride standard is 100,000~150,000, and the molecular weight(g/mol) of the polystyrene standard is 190,000.

The aqueous polyvinyl chloride emulsion solid content may be included in the content of 10 to 90 parts by weight, based on 100 parts by weight of the base resin solid content. If the aqueous polyvinyl chloride emulsion solid content is less than 10 parts by weight, based on 100 parts by weight of the base resin solid content, there is a concern about deterioration of flame retardancy, and if it is greater than 90 parts by weight, there is a concern about deterioration of adhesion property. The 'aqueous polyvinyl chloride emulsion solid content' means the whole components except the aqueous medium in the aqueous polyvinyl chloride emulsion, and the 'base resin solid content' means the whole components except the aqueous medium in the base resin.

The base resin solid content and the aqueous polyvinyl chloride emulsion solid content may be included in the weight ratio of 90:10 to 10:90 (base resin solid content: aqueous polyvinyl chloride emulsion solid content). Outside the above mixing weight ratio, if the base resin solid content is less than 10 parts by weight, and the aqueous polyvinyl chloride emulsion is greater than 90 parts by weight, there is a concern about deterioration of adhesion property, and if the base resin solid content is greater than 90 parts by weight, and the aqueous polyvinyl chloride emulsion is less than 10 parts by weight, there is a concern about deterioration of flame retardancy.

Considering excellent adhesion and flame retardancy improvement effects according to the control of the content ratio of the base resin and aqueous polyvinyl chloride emulsion, more specifically, the base resin solid content and the aqueous polyvinyl chloride emulsion solid content may be included at the weight ratio of 60:40 to 90:10, or 70:30 to 85:15.

In the aqueous flame retardant adhesive composition, the cyclohexane-based plasticizer may be specifically a cyclohexane dicarboxylate-based compound comprising 2 $C_{4-10}$ alkyl groups.

In the cyclohexane dicarboxylate-based compound, two alkyl groups may be identical to or different from each other. More specifically, two alkyl groups may be identical to each other, and they may be $C_{4-10}$ alkyl groups, and more specifically, two alkyl groups may be $C_{4-8}$ linear alkyl group such as n-butyl, and the like; or $C_{6-10}$ branched alkyl groups such as isononyl, and the like.

In case the cyclohexane dicarboxylate-based compound is included in an adhesive composition, Tg may be lowered, and thickening effect may be provided. And, due to excellent freezing resistance, adhesion property and low temperature stability of the adhesive composition may be improved.

As more specific examples, di(2-ethylhexyl)cyclohexane-1,2-dicarboxylate, di(2-ethylhexyl)cyclohexane-1,3-dicarboxylate, di(2-ethylhexyl)cyclohexane dicarboxylate(DEHCH), diisononyl cyclohexane-1,2-dicarboxylate(DINCH), di(2-ethylhexyl)cyclohexane-1,4-diester(DOCH) or dibutyl cyclohexane-1,4-dicarboxylate(DBCH), and the like may be mentioned, and one of them or mixtures of two or more kinds may be used. The di(2-ethylhexyl)cyclohexane dicarboxylate(DEHCH) may be one or more selected from di(2-ethylhexyl)cyclohexane-1,2-dicarboxylate, di(2-ethylhexyl)

cyclohexane-1,3-dicarboxylate and di(2-ethylhexyl) cyclohexane-1,4-dicarboxylate.

Among them, the DEHCH is one or more selected from compounds represented by the following Chemical Formula 1 to Chemical Formula 3, and it has excellent adhesion and low temperature stability improvement effects, and may realizes excellent coating property due to low viscosity at room temperature and low temperature. And, compared to the existing phthalate-based plasticizers, it may minimize generation of volatile organic compounds.

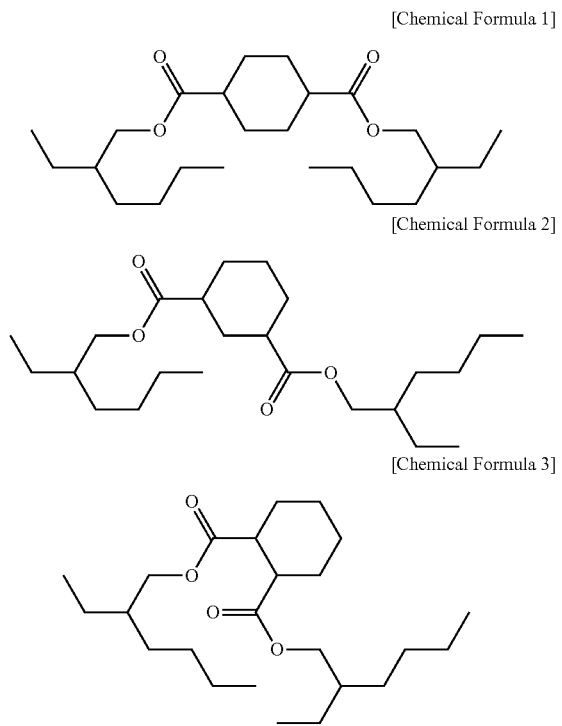

[Chemical Formula 1]

[Chemical Formula 2]

[Chemical Formula 3]

The cyclohexane-based plasticizer may be included in the content of 10 to 30 parts by weight, based on 100 parts by weight of the base resin solid content. If the content of the cyclohexane-based plasticizer is less than 10 parts by weight, based on 100 parts by weight of the base resin solid content, adhesion and low temperature stability improvement effects according to the inclusion of the plasticizer may be insignificant, and if it is greater than 30 parts by weight, shear strength of the adhesive may be lowered. Considering excellent improvement effect according to control of the content, it may be more preferable that the plasticizer is included in the content of 20 to 30 parts by weight, based on 100 parts by weight of the base resin solid content.

In the aqueous flame retardant adhesive composition, the benzoate-based plasticizer may be, for example, one or more selected from the group consisting of sodium benzoate, isononyl benzoate, isodecyl benzoate, 2-propylheptyl benzoate, diethylene glycol dibenzoate, dipropylene glycol dibenzoate, 1,2-dipropylene glycol dibenzoate and dibutylene glycol dibenzoate.

In case the benzoate-based compound is included in the adhesive composition, with improvement in gelling speed, processability may be improved, and due to excellent compatibility with the base resin, extraction resistance may be improved.

The benzoate-based plasticizer may be included in the content of 5 to 30 parts by weight, based on 100 parts by weight of the base resin solid content. If the content of the benzoate-based plasticizer is less than 5 parts by weight, based on 100 parts by weight of the base resin solid content, processability and extraction resistance improvement effects may be insignificant, and if it is greater than 30 parts by weight, viscosity of the composition may increase, and storage stability may be deteriorated.

And, the aqueous flame retardant adhesive composition according to the embodiment of the invention may further comprise additives, for example, one or more selected from the group consisting of a crosslinking agent, an initiator, a low molecular weight body, epoxy resin, a UV stabilizer, an antioxidant, a coloring agent, a reinforcing agent, a defoaming agent, a plasticizer, a blowing agent, an organic salt, a thickener and a flame retardant. The additives may be appropriately selected according to the properties to be improved in the vinyl chloride-based resin composition.

The aqueous flame retardant adhesive composition may be prepared by a preparation method comprising steps of: conducting emulsion polymerization or seed emulsion polymerization of vinyl chloride monomers alone, or a mixture of vinyl chloride monomers and comonomers copolymerizable therewith in an aqueous medium, to prepare an aqueous polyvinyl chloride emulsion in which polyvinyl chloride is dispersed in the aqueous medium (step 1); and mixing the aqueous polyvinyl chloride emulsion with base resin selected from the group consisting of vinyl acetate-ethylene copolymer, acryl-based resin, urethane-based resin, and silicon-based resin, and adding a cyclohexane-based plasticizer and a benzoate-based plasticizer and mixing them (step 2).

Hereinafter, each step will be explained, and first, step 1 for the preparation of the aqueous flame retardant adhesive composition is a step of preparing an aqueous polyvinyl chloride emulsion.

Specifically, the aqueous polyvinyl chloride emulsion may be prepared by conducting emulsion polymerization or seed emulsion polymerization of vinyl chloride monomers alone, or a mixture of vinyl chloride monomers and comonomers copolymerizable therewith in an aqueous medium, while adding an emulsifier, and a polymerization initiator.

Wherein, the kinds of vinyl chloride monomers and comonomers copolymerizable therewith are as explained above.

And, as the emulsifier, an anionic emulsifier or a non-ionic emulsifier, and the like may be used alone or in combination of two or more kinds. As the anionic emulsifier, carboxylic acid, alkyl sulfonic acid, alkyl benzene sulfonic acid, α-olefin sulfonic acid or alkyl phosphoric acid, and the like may be used. As the non-ionic emulsifier, polyoxyethylene ether, polyoxyethylene alkyl phenyl ether, polyoxyethylene alkenyl ether, polyoxyethylene derivatives, glycerin fatty acid ester, sorbitan fatty acid ester, polyoxyethylene fatty acid ester, silicon-based emulsifiers, and the like may be used.

The emulsifier may be introduced in the aqueous medium at one time before the polymerization reaction, or it may be continuously introduced in the aqueous medium during the polymerization reaction. Alternatively, it may be added to latex after the polymerization reaction is completed, and if necessary, the above methods may be combined.

And, during the emulsion polymerization or seed emulsion polymerization, a dispersion aid may be further used, as necessary.

The dispersion aid is used to maintain stability of polymerization and latex together with the emulsifier, and specifically, higher alcohols such as lauryl alcohol, myristic alcohol, stearyl alcohol, or higher fatty acids such as lauric acid, myristic acid, palmitic acid, stearic acid, and the like may be used.

And, as the polymerization initiator used in the emulsion polymerization or seed emulsion polymerization, water soluble polymerization initiators such as ammonium persulfate, potassium persulfate, sodium persulfate or hydrogen peroxide, and the like may be used, and a reducing agent such as sodium sulfite, sodium ascorbic acid, and the like may be used together, as necessary.

And, as the aqueous medium, water such as distilled water, deionized water, and the like may be used.

An aqueous polyvinyl chloride emulsion(or vinyl chloride resin latex) in which polyvinyl chloride fine particles are dispersed in an aqueous medium, specifically water, may be prepared by mixing the above components, and conducting a polymerization.

After the polymerization is completed, a process for removing unreacted monomers may be optionally further conducted, and the polymerization conditions may be appropriately modified according to the properties of polyvinyl chloride to be realized.

And, in the aqueous polyvinyl chloride emulsion, a solid content comprising polyvinyl chloride may be about 30 to about 60 wt %, but it may vary according to a polymerization method.

Next, step 2 is a step of mixing the aqueous polyvinyl chloride emulsion prepared in step 1 with base resin, and adding a cyclohexane-based plasticizer and a benzoate-based plasticizer and mixing them.

Wherein the kind and mixing ratio of the base resin are as explained above, and the mixing may be conducted according to a common method.

And, when mixing the aqueous polyvinyl chloride emulsion and base resin, the cyclohexane-based plasticizer and the benzoate-based plasticizer are further added, and the kind and content of each plasticizer are as explained above.

The aqueous flame retardant adhesive composition prepared according to the above preparation method may exhibit excellent flame retardancy even without using a common flame retardant. Specifically, the adhesive composition exhibits flame retardancy of VO or V1, when evaluating flame retardancy according to UL94 V flame retardant regulation. Thus, it may reduce cost through replacement the conventional organic flame retardant, and improve layer separation of adhesive according to the addition of inorganic flame retardant.

Thus, the aqueous flame retardant adhesive composition is environment-friendly, and may be useful for various fields such as construction, industries, requiring excellent flame retardancy and adhesion and low temperature stability.

Thus, according to another embodiment of the invention, there is provided an article comprising the aqueous flame retardant adhesive composition. The article may be specifically construction/industrial adhesive, an adhesion film, a deco sheet, flooring material, artificial leather, or toy.

Hereinafter, the invention will be explained in more detail for better understanding of the invention. However, the following examples are presented only as the illustrations of the invention, and the scope of the invention is not limited thereby.

<Preparation of Aqueous PVC Emulsion>

PREPARATION EXAMPLE

In a high pressure reactor, 76 kg of deionized water, 39.55 kg of vinyl chloride monomers and 16.95 kg of vinyl acetate monomers were introduced, and then, emulsion polymerization was conducted at the high pressure reactor temperature of 65° C. to prepare an aqueous polyvinyl chloride emulsion in which vinyl chloride/vinyl acetate copolymer is dispersed in water.

Polyvinyl chloride in the prepared aqueous polyvinyl chloride emulsion has Tg of 60° C., average particle diameter of 180 nm, weight average molecular weight of 75,000 g/mol, and a solid content in emulsion of 43 wt %.

<Preparation of Aqueous Flame Retardant Adhesive Composition>

Example 1

As base resin, an aqueous VAE emulsion(VINNAPAS™ EP 706, Wacker Chemie AG, average particle diameter 1 μm, Tg 5° C.) and the aqueous PVC emulsion solid content prepared in the Preparation Example were mixed at the weight ratio of 70:30, and a cyclohexane-based plasticizer (bis(2-ethylhexyl) cyclohexane-1,4-dicarboxylate, Eco-DEHCH, Hanwha solutions) was additionally added in an amount of 20 parts by weight, based on 100 parts by weight of the base resin solid content, and a benzoate-based plasticizer (dipropylene glycol dibenzonate, BF 9-88, Eastman) was additionally added in an amount of 10 parts by weight, based on 100 parts by weight of the base resin solid content, thus preparing an aqueous flame retardant adhesive composition.

Example 2

An aqueous flame retardant adhesive composition was prepared by the same method as Example 1, except that the benzoate-based plasticizer (dipropylene glycol dibenzonate, BF 9-88, Eastman) was used in an amount of 30 parts by weight, instead of 10 parts by weight, based on 100 parts by weight of the base resin solid content.

Example 3

An aqueous flame retardant adhesive composition was prepared by the same method as Example 1, except that diethylene glycol dibenzoate (BF 50, Eastman) was used as a benzoate-based plasticizer.

Example 4

An aqueous flame retardant adhesive composition was prepared by the same method as Example 1, except that diethylene glycol dibenzoate (BF 50, Eastman) was used in an amount of 30 parts by weight, based on 100 parts by weight of the base resin solid content, as a benzoate-based plasticizer.

Comparative Example 1

An aqueous flame retardant adhesive composition was prepared by the same method as Example 1, except that a benzoate-based plasticizer was not used.

Comparative Example 2

An aqueous flame retardant adhesive composition was prepared by the same method as Example 1, except that a cyclohexane-based plasticizer was not used.

EXPERIMENTAL EXAMPLE

The adhesive compositions prepared in Examples and Comparative Examples were evaluated in terms of flame retardancy, adhesive strength, low temperature stability, extraction resistance and processability. The results were shown in the following Table 2.

(1) Flame retardancy: Flame retarding degree was measured in a 125 mm*13 mm*1 mm bar specimen according to flame retardant test of UL94 V(Vertical Burning Test), and evaluated according to the standard described in the following Table 1.

<Flame Retardancy Evaluation Standard>

TABLE 1

|  | V0 | V1 | V2 |
|---|---|---|---|
| Individual afterflame time | ≤10 sec. | ≤30 sec. | ≤30 sec. |
| Afterflame plus afterglow time after the second flame application | ≤30 sec. | ≤60 sec. | ≤60 sec. |
| Cotton ignition | No | No | Yes |
| Flame retardancy evaluation | Very excellent | Good | Very inferior |

(2) Low temperature stability: Each adhesive composition prepared in Examples and Comparative Examples was stored in an oven of −4° C. and −15° C., respectively, for one day, and then, the state and viscosity of the composition was confirmed.

<Evaluation Standard>

Excellent: Both the state and viscosity of composition are normal
Average: Viscosity of the composition is changed (usable level)
Bad: Lump is generation by aggregation (non-usable level)

(3) Storage stability: BF viscosity of each adhesive composition prepared in Examples and Comparative Examples was measured after 1 hour in a 25° C. oven, and the measurement value was designated as the initial viscosity, and the composition was stored for 7 days, and then, the viscosity was confirmed.

<Evaluation Standard>

Excellent: viscosity change of the composition(initial viscosity/viscosity after 7 days) 5% or less
Average: viscosity change of the composition(initial viscosity/viscosity after 7 days) 15% or less
Bad: viscosity change of the composition(initial viscosity/viscosity after 7 days) greater than 15%

(4) Adhesive strength (peel strength): measured by 180° peel strength test(ISO 8510-2).

On both adherent sides of a test specimen of width 25 mm*length 150 mm, adhesive was applied within a thickness of 0.5 mm, and the applied amount was controlled to 400~500 g/m$^2$. An open time was maintained in about 10 minutes after applying the adhesive on the adherent side. It was pressed under a load of about 49 N(5 kgf), and after cured for 7 days, used for a test. One end of the adhered part of the test specimen was peeled about 50 mm, and both sides were fixed to a clip of a tester. Tensile speed or movement speed of the clip was set to 200±20 mm per minute.

(5) Extraction resistance: Referring to ISO 177:1988 test standard, the composition was coated/dried, and then, oilpapers were positioned above/below the coated side, 5 kg load was applied in a 60° C. constant temperature oven, stored for 7 days, and weight change of the sheet was measured.

<Evaluation Standard>

Excellent: weight change of sheet 3% or less
Average: weight change of sheet 5% or less
Bad: weight change of sheet greater than 5%

(6) Processability(gelling speed): A gelling speed was measured at a temperature of 120° C. using SVNC (Scanning vibrating needle curemeter). As gelling progresses in the SVNC equipment, amplitude decreases, and using such decrease speed, gelling speed was compared and measured, and the gelling speed was scored (very excellent 5>4>3>2>1 very inferior)

TABLE 2

|  | Example 1 | Example 2 | Example 3 | Example 4 | Comparative Example 1 | Comparative Example 2 |
|---|---|---|---|---|---|---|
| Flame retardancy | V0 | V0 | V0 | V0 | V0 | V0 |
| Low temperature stability | Excellent | Excellent | Average | Excellent | Excellent | Bad |
| Storage stability | Excellent | Bad | Average | Bad | Excellent | Bad |
| Peel strength (gf/mm) | 25.3 | 24.8 | 23.3 | 23.8 | 25.8 | 24.4 |
| Extraction resistance | Excellent | Excellent | Excellent | Excellent | Inferior | Average |
| Processability (gelling speed) | 5 | 5 | 4.5 | 5 | 3 | 3 |

As shown in the Table 2, it can be confirmed that in Examples of the invention, low temperature stability and adhesive strength were equivalent to or more excellent than Comparative Examples, and yet, extraction resistance and processability were greatly improved.

The invention claimed is:

1. An aqueous flame retardant adhesive composition comprising
a base resin selected from the group consisting of vinyl acetate-ethylene copolymer, acryl-based resin, urethane-based resin, and silicon-based resin;
an aqueous polyvinyl chloride emulsion;
a cyclohexane-based plasticizer; and
a benzoate-based plasticizer,
wherein the cyclohexane-based plasticizer is included in the content of 10 to 30 parts by weight, based on 100 parts by weight of the base resin solid content, and
the benzoate-based plasticizer is included in the content of 5 to 30 parts by weight, based on 100 parts by weight of the base resin solid content.

2. The aqueous flame retardant adhesive composition according to claim 1, wherein the base resin is an aqueous emulsion.

3. The aqueous flame retardant adhesive composition according to claim 1, wherein the polyvinyl chloride in the aqueous polyvinyl chloride emulsion has an average particle diameter of 100 nm to 1 μm, and weight average molecular weight of 45,000 to 300,000 g/mol.

4. The aqueous flame retardant adhesive composition according to claim 1, wherein the aqueous polyvinyl chloride emulsion solid content is included in the content of 10 to 90 parts by weight, based on 100 parts by weight of the base resin solid content.

5. The aqueous flame retardant adhesive composition according to claim 1, wherein the composition comprises the base resin solid content and the aqueous polyvinyl chloride emulsion solid content at the weight ratio of 10:90 to 90:10.

6. The aqueous flame retardant adhesive composition according to claim 1, wherein the cyclohexane-based plasticizer is a cyclohexane dicarboxylate-based compound comprising 2 C4-10 alkyl groups.

7. The aqueous flame retardant adhesive composition according to claim 1, wherein the cyclohexane-based plasticizer comprises one or more selected from the group consisting of di(2-ethylhexyl)cyclohexane-1,2-dicarboxylate, di(2-ethylhexyl)cyclohexane-1,3-dicarboxylate, di(2-ethylhexyl)cyclohexane-1,4-dicarboxylate, diisononylcyclohexane-1,2-dicarboxylate, di(2-ethylhexyl)cyclohexane-1,4-diester and dibutylcyclohexane-1,4-dicarboxylate.

8. The aqueous flame retardant adhesive composition according to claim 1, wherein the cyclohexane-based plasticizer is included in the content of 20 to 30 parts by weight, based on 100 parts by weight of the base resin solid content.

9. The aqueous flame retardant adhesive composition according to claim 1, wherein the benzoate-based plasticizer is one or more selected from the group consisting of sodium benzoate, isononyl benzoate, isodecyl benzoate, 2-propylheptyl benzoate, diethylene glycol dibenzoate, dipropylene glycol dibenzoate, 1,2-dipropylene glycol dibenzoate and dibutylene glycol dibenzoate.

10. The aqueous flame retardant adhesive composition according to claim 1, wherein the benzoate-based plasticizer is included in the content of 10 to 30 parts by weight, based on 100 parts by weight of the base resin solid content.

11. The aqueous flame retardant adhesive composition according to claim 1, further comprising one or more additives selected from the group consisting of an initiator, a low molecular weight body, epoxy resin, a UV stabilizer, an antioxidant, a coloring agent, a reinforcing agent, a defoaming agent, a plasticizer, a blowing agent, an organic salt, a thickener and a flame retardant.

12. The aqueous flame retardant adhesive composition according to claim 1, wherein the aqueous flame retardant adhesive composition exhibits flame retardancy of VO or V1, when evaluating flame retardancy according to the flame retardant regulation of UL94 V.

13. A method for preparing the aqueous flame retardant adhesive composition of claim 1, comprising steps of:
conducting emulsion polymerization or seed emulsion polymerization of vinyl chloride monomers alone, or a mixture of vinyl chloride monomers and comonomers copolymerizable therewith in an aqueous medium, to prepare an aqueous polyvinyl chloride emulsion in which polyvinyl chloride is dispersed in the aqueous medium; and
mixing the aqueous polyvinyl chloride emulsion with base resin selected from the group consisting of vinyl acetate-ethylene copolymer, acryl-based resin, urethane-based resin, and silicon-based resin, and adding a cyclohexane-based plasticizer and a benzoate-based plasticizer and mixing them,
wherein the cyclohexane-based plasticizer is added in the content of 10 to 30 parts by weight, based on 100 parts by weight of the base resin solid content, and
the benzoate-based plasticizer is added in the content of 5 to 30 parts by weight, based on 100 parts by weight of the base resin solid content.

14. The method according to claim 13, wherein the cyclohexane-based plasticizer is a cyclohexane dicarboxylate-based compound comprising 2 C4-10 alkyl groups.

15. The method according to claim 13, wherein the benzoate-based plasticizer is one or more selected from the group consisting of sodium benzoate, isononyl benzoate, isodecyl benzoate, 2-propylheptyl benzoate, diethylene glycol dibenzoate, dipropylene glycol dibenzoate, 1,2-dipropylene glycol dibenzoate and dibutylene glycol dibenzoate.

16. An article comprising the aqueous flame retardant adhesive composition according to claim 1.

17. The article according to claim 16, wherein the article is adhesive, an adhesion film, a deco sheet, flooring material, artificial leather or toy.

18. The aqueous flame retardant adhesive composition according to claim 1,
wherein the composition comprises the cyclohexane-based plasticizer; and the benzoate-based plasticizer at the weight ratio of 20:10 to 20:30.

* * * * *